United States Patent [19]

Sharp

[11] Patent Number: 4,739,659
[45] Date of Patent: Apr. 26, 1988

[54] DOUBLE WALL RIBBED STORAGE TANKS

[76] Inventor: Bruce R. Sharp, 4090 Rosehill Ave., Cincinnati, Ohio 45229

[21] Appl. No.: 37,031

[22] Filed: Apr. 10, 1987

Related U.S. Application Data

[63] Continuation-in-part of Ser. No. 859,419, May 5, 1986, and a continuation-in-part of Ser. No. 824,680, Jan. 31, 1986, which is a continuation-in-part of Ser. No. 745,540, Jun. 17, 1985, and a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and a continuation-in-part of Ser. No. 580,800, Feb. 16, 1984, Pat. No. 4,524,609, which is a continuation-in-part of Ser. No. 544,012, Oct. 21, 1983, abandoned.

[51] Int. Cl.[4] .............................................. G01M 3/00
[52] U.S. Cl. ...................................... 73/49.2; 220/445
[58] Field of Search ............... 73/49.2, 49.3; 220/5 A, 220/445, 444, 83; 340/605

[56] References Cited

U.S. PATENT DOCUMENTS

| 1,235,128 | 7/1917 | Frank | 220/445 |
| 1,950,234 | 3/1934 | Ewertz | 220/445 |
| 2,254,964 | 9/1941 | Kettlewell | 220/445 |
| 3,335,903 | 8/1967 | Anderson | 220/83 |
| 3,335,904 | 8/1967 | Anderson | 220/83 |
| 3,506,224 | 4/1970 | Harr et al. | 220/445 |
| 3,700,512 | 10/1972 | Pearson et al. | 156/62.4 |
| 3,902,356 | 9/1975 | Rupf-Bolz | 73/49.2 |
| 4,537,328 | 8/1985 | Keesee et al. | 220/445 |
| 4,561,292 | 12/1985 | Pugnale et al. | 73/49.2 |

FOREIGN PATENT DOCUMENTS 2356750 11/1973 Fed. Rep. of Germany ...... 220/444

Primary Examiner—Stewart J. Levy
Assistant Examiner—Hezron E. Williams
Attorney, Agent, or Firm—Charles R. Wilson

[57] ABSTRACT

A method of making a storage tank comprises applying ribs around a inner tank, securing said ribs to the inner tank, applying gas pervious material in the space between the ribs, and applying a layer of fibrous reinforcing material and resinous material over the gas pervious material. The gas pervious material extends to a distance less than about 75% of the height of the ribs. The resultant overlay encases the surface areas between the ribs of the storage tank, and becomes a structural part thereof. Secondary containment is provided by the overlay. A monitored storage tank system is provided by the use of a leak detection means to monitor the closed space defined by the rib interiors the overlay and the storage tank.

21 Claims, 2 Drawing Sheets

DOUBLE WALL RIBBED STORAGE TANKS

This is a continuation-in-part of "Storage Tanks Made of Fibrous Reinforced Resinous Material With Secondary Containment", Ser No. 06/859,419, filed May 5, 1986 and a continuation -part-of "Storage Tanks Having Formed Rigid Jacket For Secondary Containment," Ser. No. 06/824,680, filed Jan. 31, 1986, which is a continuation-in-part of "Fiberglass Reinforced Resin Storage Tanks Having Secondary Containment," Ser. No. 06/745,540, filed June 17, 1985 and a continuation-in-part of "Storage Tanks Having Secondary Containment Means," Ser. No. 06/740,869 filed June 3, 1985 now U.S. Pat. No. 4,607,522 which is a continuation-in-part of "External Jacket System as Secondary Containment for Storage Tanks," Ser. No. 06/544,013, filed Oct. 21, 1983, now U.S. Pat. No. 4,523,454, and "Storage Tanks Systems," Ser. No. 580,800, filed Feb. 16, 1984, now U.S. Pat. No. 4,524,609, which is a continuation-in-part of Ser. No. 06,544,012, filed Oct. 21, 1983, now abandoned.

This invention relates to storage tanks. More particularly, the invention relates to ribbed underground storage tanks which have secondary containment means.

BACKGROUND OF THE INVENTION

Commercial and industrial storage tanks are widely used for storing a great variety of liquids. Some of these liquids are highly corrosive and/or are flammable. The service life of a storage tank will vary, depending upon environmental conditions, including the liquid being stored. Eventually, however, the tank will become corroded and develop leaks. This can result in a significant danger to the environment and health of nearby residents. For example, storage tanks are commonly used for storing gasoline at service stations. Gasoline, of course, is highly-flammable and is capable of posing a significant health and safety hazard if not properly contained. Federal as well as local regulations govern the structure of such storage tanks.

Heightened public awareness of the danger posed by storage tanks (particularly underground gasoline storage tanks) has led to additional governmental regulations. Recent proposed regulations will soon require most storage tanks to have secondary containment means and possibly a fail safe design feature to guard against accidental soil, water, and air contamination. Secondary containment means must be capable of containing leaked liquid from the storage tank. Rigid double walled tanks made from sheet metal have been suggested as one alternative. While effective for containment purposes, such tanks as presently available, are costly to build and difficult to install because of their weight. Such tanks are built by basically forming two rigid tanks and placing one inside the other.

Tanks made from fiberglass reinforced resinous material are also extensively used. One common method of making such tanks comprises utilizing a reuseable cylindrical-shaped half-mold in the formation of the tank's body. Initially, layers of fiberglass followed by a resinous coating are applied to the mold or chopped fiberglass/resin streams are simultaneously directed onto the mold and subsequently cured. Sufficient applications of the fiberglass and resin are made until a wall thickness is obtained which has the desired strength. Next, cardboard rib forms, four to six inches wide, are placed completely around the covered mold at approximately sixteen inch intervals and fiberglass/resin applied. The cardboard forms result in a cylindrical-shaped tanks with ribs. The purpose of the ribs is to add strength to the tank. The mold is finally removed. A cylindrical-shaped wall, including the support ribs, are produced in this stage of the method. An end cap is either fabricated during the cylinder wall-making step or added after the mold is removed. The above steps are repeated to obtain a second half-tank. The two half-tanks are then joined together by appropriate sealing means. The resultant single-walled tank is capable of being installed in the ground and, in fact, is of the type which has been used extensively for the past twenty years. Double walled tanks made of fiberglass reinforced resinous material are made by forming a second outer tank in two horizontal halves. The formed inner tank and outer tank halve are assembled and sealed to form a double walled storage tank system based on two rigid tanks with ribs therebetween.

A second method of making tanks from fiberglass reinforced resinous material utilizes a removable split half-mold with provision for forming the support ribs and end cap along with the main body. After fiberglass and resinous material are applied to the mold and cured, the mold is removed. Next, the interior portions of the rib areas are filled with a filler material, such as a closed cell foam, and fiberglass/resin applied so as to form a substantially smooth tank interior. A second tank half is formed in the same manner and joined with the first tank half. A double walled tank is made essentially by forming two additional horizontal tank halves, placing the single walled tank inside one horizontal half-tank and joining the second horizontal half-tank to the first.

U.S. Pat. No. 4,561,292, contains a description of one method of building a double walled storage tank. As is readily apparent from the patent and above discussion, building a double walled storage tank system with fiberglass and resin by known methods is very labor extensive and costly. There is also a concern about possible shifting of the support ribs away from the outer shell due to an inability to maintain close tolerances and inability to adequately hold the ribs to the outer shell. Recent concerns about leaked tanks has heightened the need for an efficient and economical manner of building double walled storage tank system.

There has now been discovered a method whereby storage tanks are built with secondary containment means in a convenient, yet economical manner. Such tanks can also be equipped with means to monitor for leakage.

SUMMARY OF THE INVENTION

A method of building a strenghtened double walled ribbed storage tank with secondary containment capability comprises the steps of (a) adding spaced circumferentially extending rib supports to a cylindrical-shaped rigid inner storage tank, (b) securing said rib supports to the inner tank, (c) applying a thin layer of gas pervious material to the spaces between the support ribs to a distance less than about 75% of the height of the ribs so that a spaced relationship is maintained between the storage tank and a subsequently formed overlay, (d) applying a layer of a fibrous reinforcing material onto the gas pervious material and (e) applying a resinous material onto or with the reinforcing material. When the resinous material is cured, an overlay is formed which is attached to the ribs' side walls. The interior spaces defined by the overlays and interior rib walls can be monitored for any leakage.

DETAILED DESCRIPTION OF THE INVENTION

Figure 1:
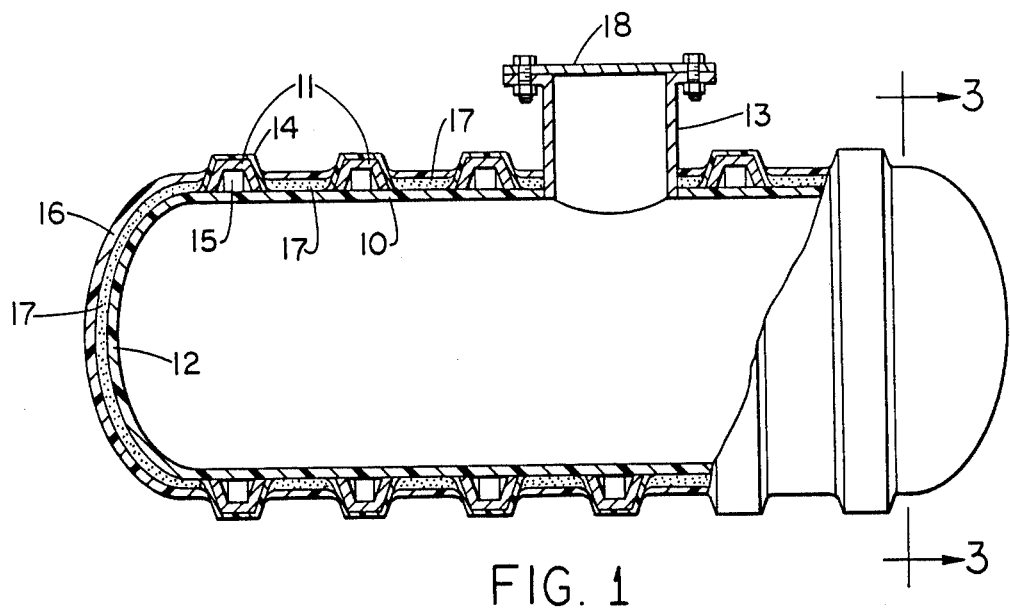
FIG. 1 is a side view of a double walled ribbed storage tank having support ribs surrounding an inner tank and an overlay of a fibrous reinforced resinous material over spaces between the ribs.
Figure 2:
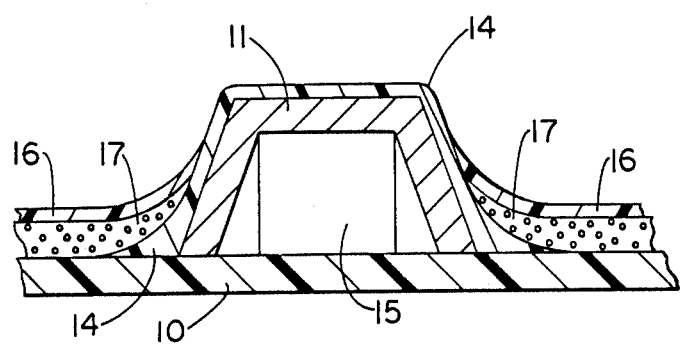
FIG. 2 is an enlarged sectional view of a support rib found on th storage tank of FIG. 1.
Figure 3:
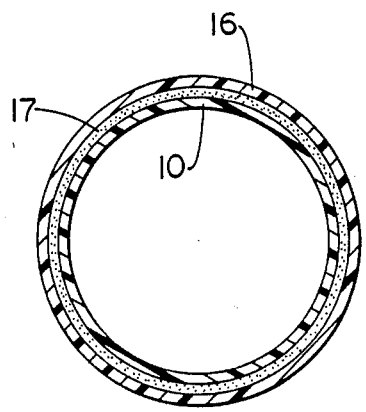
FIG. 3 is an end view of the storage tank of FIG. 1 taken along line 3—3.

With reference to FIG. 1, there is shown a double walled storage tank system. Inner storage tanks of the type used in FIG. 1 are well known and are widely used, especially in the gasoline service station industry. Such tanks comprise main body 10, end caps 12, and manhead 13. Main body 10 and end caps 12 are made of steel or a conventional fibrous reinforced resinous material. In accord with the invention, circumferentially extending support ribs 11 are positioned around tank body 10 and are subsequently secured to the tank body. Preferably, an overlay 14 of fibrous reinforced resinous material is used to secure the ribs. The ribs are typically made of cardboard. They can also be in the form of a foam mold such that the foam and the rigid overlay 14 act as support ribs. The ribs act as support so that the weight of the tank, including the contents therein are evenly distributed and add strength needed to withstand earth load stresses. The support ribs in FIG. 1 are hollow and have a trapezoid shape. They form spaces 15 when placed on the tank body. A sufficient number of openings are found in the storage tank 10 to allow for various access lines to communicate with the interior of the tank. For instance, a fill pipe, dispensing line and vent pipe can enter the storage tank at various points in the tank's surface, but preferably all enter through the cover 18 and the manhead 13.

A gas pervious material is next applied to the surface area on the inner tank's outer surface between the ribs 11, including end caps 12 The purpose of the gas pervious material is to insure that a subsequently applied fibrous reinforcing material and resinous material which form an overlay 16 will adhere to the inner storage tank only at selected spots, i.e. the sides and, optionally, the tops of support ribs 11. It is necessary that the inner tank and the cured overlay over the aforementioned surface areas have a space between the two. Such space is closed and, along with the space enclosed by the ribs, provides secondary containment capability. Another function or the closed space is to provide a means by which the space therein can be monitored for possible tank or overlay leaks.

Gas pervious materials are foraminous or porous and can take on various physical shapes and structures. Examples of such material are foams, mattings, nets, screens, and meshes. Specific examples are jute, polyurethane foam, polyester foam, polyether foam, fiberglass matting, cotton matting, nylon matting, corrugated cardboard, and asbestos. A heat seal or sealing material, e.g. a polymeric coating is used on one surface of the gas pervious material when needed to prevent substantial saturation with a subsequently applied resinous material as discussed in following paragraphs. The aforementioned foams with a mesh or net backing are also useful; such materials provide dimensional stability in the separating means so that distortion caused by a subsequent application of resinous material will be substantially reduced.

The minimum thickness of the gas pervious material must be sufficient to prevent the subsequently applied overlay from adhering to the storage tank. Accordingly, any shrinkage resulting from the overlay must be accounted for by having a gas pervious material thick enough to be partially collapsed, but not closed. To a certain extent, a spaced relationship between the inner tank 10 and overlay 16 results by allowing limited resin penetration through the gas pervious material 17. In effect, randomly spaced rigid resin columns will form when the resin cures. This also strenghtens the tank system while not adversely affecting the secondary containment or monitoring features provided by this tank system. At the same time, the gas pervious material has a thickness of less than about 75% of the height of the ribs, more preferably less than about 50% and most preferably less than about 25% of the height of the ribs. It has been found increased strength of the system is achieved due to the close proximity of the tank and overlay material and resultant composite strength. Still further, by requiring that the gas pervious material not fill the spaces between the ribs to the ribs' tops, the overlay 16 must necessarily form on the ribs' side walls. This has the effect of strenghtening the ribs with an overall more sturdy tank system. The tops of the ribs can be at least partially covered with the overlay 16 due to normal manufacturing controls, though no added benefit is gained.

Overlay 16 is a fibrous reinforced resinous material. It is formed in one method by first applying a layer of fibrous reinforcing material on the gas pervious material 17. The fibrous reinforcing material can take on many different physical shapes and structures variously referred to as mattings, nets, screens, meshes, and chopped strands. Examples of fibrous materials include fiberglass, nylon, and other synthetic fibrous materials. The fibrous material, if in sheet form, can be laid onto the storage tank as a continuous matting.

Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene polyvinylchloride, polyurethane, and polyepoxide. The listed resinous materials used in the construction of this overlay are not all inclusive, but only illustrative of some of the resinous materials which can be used.

Alternatively, the fibrous material can be applied in the form of chopped strands along with the resinous materials described in the previous paragraph. That is, the chopped strand and resinous materia are sprayed from separate nozzels of the same spray gun and the overlay formed therefrom on the gas pervious material as the resin cures.

The shape of the resultant overlay is such that it encases the end caps and the surface areas between ribs 11 to form a closed space. The overlay itself is capable of containing any liquid which is stored in the storage tank and which has leaked therefrom. The overlay itself gains strength from the support ribs.

Figure 4:
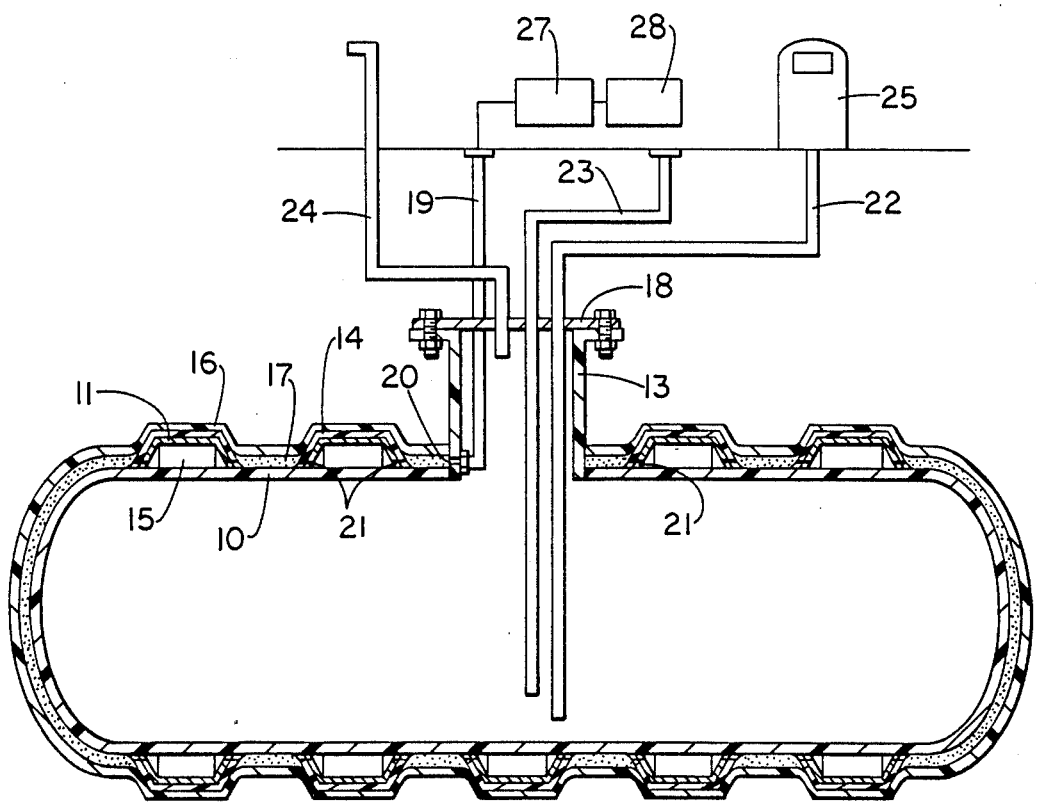
FIG. 4 is a side view of storage tank of this invention illustrating the use of monitor means.
Figure 5:
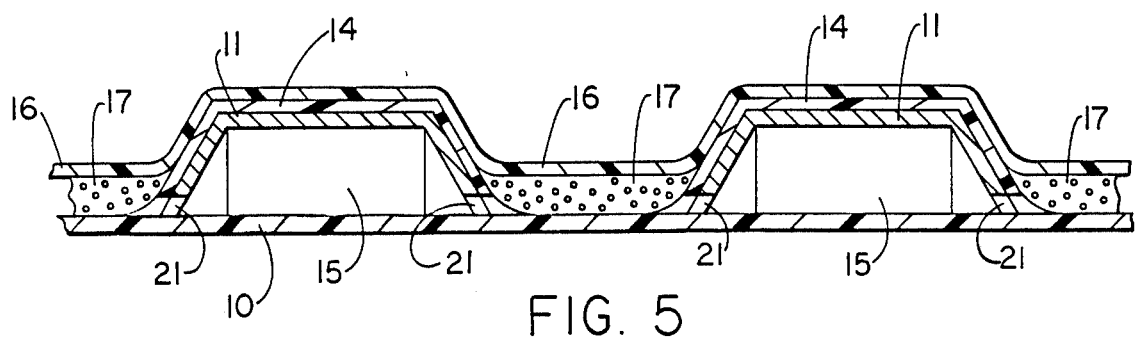
FIG. 5 is an enlarged sectional view of two support ribs of the storage tank of FIG. 4.

With reference to FIG. 4, there is shown a storage tank 10 of the type described in FIG. 1 wherein the spaces between the support ribs are monitored. An access tube 19 extends from ground level through manhead 13 and access hole 20 so as to be in communication with the closed space. Preferably, the spaces 15 enclosed by the rib side walls and the spaces formed by overlay 16 are in communication. This is accomplished in one method by laying at least one apertured tube along the length of the inner tank 10 prior to placing the ribs thereon. Subsequent steps of securing the ribs to the inner tank, applying the gas pervious material and the overlay are done in a fashion above described. Preferably, at least two apertured tubes are used with one being positioned along the bottom of the tank and one along the top of the tank. Alternatively a tube or rod is used in place of the apertured tube and removed after the final overlay is in place. The result being a tank system with a tunnel 21 extending the length of the inner tank's outside surface.

Secondary containment of liquid stored in storage tank 10 is provided by the rib interiors 15 and the overlay 16. Monitoring of the containment means is readily accomplished when said containment space is continuous. The apertured tube or tunnel provides the communication.

Also shown in FIG. 4 are features found on a typical underground storage tank system. Thus, a manhead cover 18 with attachment means (nuts and bolts) provides a sealed primary containment of the gasoline. Access lines comprised of dispensing line 22, fill line 23 and vent pipe 24 extend through the manhead cover 18. Dispensing line 22 extends to dispenser 25.

Any of well know and commercially available monitor means are used for monitoring the spaces between ribs or the total containment space. For example, the closed space can be filled with a detecting liquid. At the end of the access tube is a sight glass. Whenever leakage occurs, a change in the level or color of a detecting liquid will occur and will be readily observed as a change in level or color of detecting liquid. Non-visual leak detection means such as pressure transducers or float controls can also be used.

Alternatively, the closed space can be placed either under a non-atmospheric pressure, i.e. a positive or negative air pressure. Detection means associated with the closed space is capable of detecting any change in pressure resulting from a leak in the overlay or the storage tank. As shown in FIG. 4, there is provided a means 27 for maintaining the closed space under a positive or negative pressure. Conventional air pump or vacuum pump, together with an associated pressure regulator can be used. A pressure change sensor 28 is a part of the detection means. A pressure gauge serves this purpose adequately. Optionally, an alarm system can be electronically linked with the pressure sensor to audibly or visually warn of a preset significant pressure change. A vacuum is preferred because of a resultant increased composite strength of the storage tank/overlay system.

Another embodiment of the detection means utilizes an analyzer capable of detecting the liquid being stored. Thus, the detection means comprises the analyzer which is communication with closed space Preferably, a vacuum means for withdrawing gaseous material from the closed space is used for the purpose of obtaining a sample. Thus, in FIG. 4, element 28 is an analyzer capable of detecting selected liquids instead of a pressure change sensor.

Still another detection means utilizes a probe which extends through the access tube so as to monitor for leakage at or near the bottom of the closed space. The probe is capable of detecting preselected liquids or gases. In this embodiment, leakage will ultimately seep to the bottom of the closed space and be detected.

All the leak detection means discussed above can be electronically linked with an alarm system to audibly or visually warn of a pre-set significant change in the closed spaces. The leak detection means an secondary containment means allow for an early warning of a deterioration of either the primary or secondary containment means thereby permitting the necessary repair work to be done before any significant soil or water contamination has occurred.

While the invention has been described with respect to preferred embodiments, it is understood that various modifications may be made without departing from the spirit of the subject invention as defined by the appended claims.

What is claimed is:

1. A method of building a double walled ribbed storage tank system having secondary containment capability, comprising the steps of:
   (a) adding spaced circumferentially extending support ribs to a cylindrical shaped inner tank;
   (b) securing said support ribs to the inner tank;
   (c) applying a thin gas pervious material to the surface areas between the support ribs of the storage tank to a distance less than about 75% of the height of the ribs so as to prevent an adherence between the storage tank and a subsequently formed overlay;
   (d) applying a layer of fibrous reinforcing material completely over the gas pervious material; and
   (e) applying a resinous material onto or with said reinforcing material to cover the gas pervious material and at least partially cover the side walls of the ribs so that when cured an overlay of fibrous reinforced resinous material is bonded to the side walls, thereby providing the secondary containment for any liquid in the rigid storage tank which may leak therefrom.

2. The method of claim 1 wherein the gas pervious material fills the space between the ribs to a distance less than about 50% of the height of the rib.

3. The method of claim 2 wherein the gas pervious material fills the space between the ribs to a distance less than about 25% of the height of the rib.

4. The method of claim 1 wherein the inner tank is made of metal.

5. The method of claim 1 wherein the inner tank is made of a fiberglass reinforced resinous material.

6. The method of claim 3 wherein the overlay or fibrous reinforcing material and resinous material covers the support ribs so that when cured an overlay is formed which is bonded to the side and top surfaces of the support ribs.

7. The method of claim 6 wherein the gas pervious material is a foam matting, net, screen or mesh.

8. The method of claim 1 wherein at least one apertured tube is laid along the length of the inner tank prior to positioning the support ribs so as to provide a means of communication throughout the tank system for continuous monitoring of the storage tank walls and overlay to detect leakage.

9. The method of claim 2 wherein the support ribs are hollow and have a trapezoid shape.

10. The method of claim 1 wherein the fibrous reinforcing material and resinous material are applied substantially simultaneously and cured to form the overlay.

11. The method of claim 1 wherein the fibrous reinforcing material and resinous material extend over end caps of the srorage tank.

12. A double walled ribbed storage tank having secondary containment means, comprising:
 (a) an inner tank for holding liquid having spaced support ribs encircling the outer surface of said tank;
 (b) gas pervious material positioned on the outer surface of the tank and within the surface areas between the support ribs to a distance of less than about 75% of the height of the ribs; and
 (c) overlays of fibrous reinforced resinous material covering the gas pervious material and adhered to the side walls of the support ribs such that secondary containment for the liquid in the storage tank is provided by the support ribs and overlay.

13. The storage tank of claim 12 wherein the gas pervious material extends to a distance less than about 50% of the height of the rib.

14. The storage tank of claim 13 wherein the gas pervious material extends to a distance of less then about 25% of the height of the support ribs.

15. The storage tank of claim 12 wherein the support ribs are secured to the storage tank by a fibrous reinforced resinous material and each space enclosed by a rib is empty.

16. The storage tank of claim 12 wherein the fiorous reinforcing material used in forming the overlay is fiberglass.

17. The storage tank of claim 16 wherein the gas pervious material is a foam, matting, net, screen or mesh.

18. The storage tank of claim 17 wherein the overlay is adhered to the side walls and top surfaces of the support ribs.

19. The storage tank of claim 18 wherein said surface areas between the ribs include end caps of the storage tank.

20. The storage tank of claim 19 wherein means are provided in each support rib so that the spaces enclosed by the support ribs and the spaces covered by the overlays are in communication with one another.

21. The storage tank of claim 20 further comprising monitor means in communication with at least one of the enclosed spaces for the purpose of detecting a leak in the inner rigid tank and/or overlay.

* * * * *